R. W. CHAPMAN.
Traveling-Bag Handle.
No. 208,793. Patented Oct. 8, 1878.
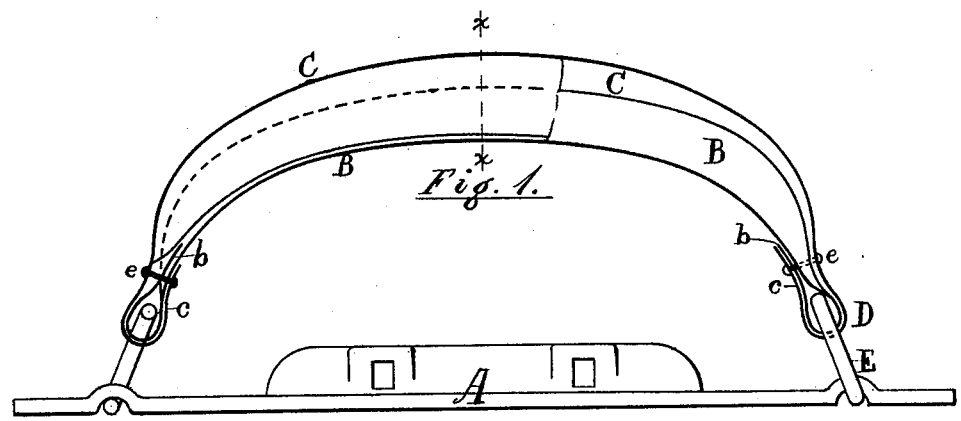
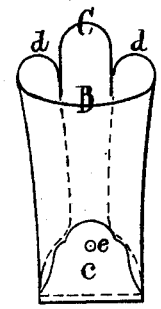 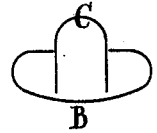 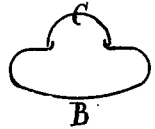 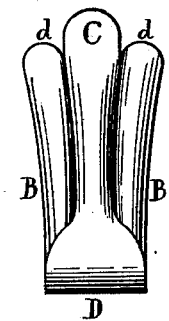
Attest:
C. W. Smith
E. P. Roberts
Inventor.
Robt. W. Chapman, per
Thos. S. Crane, Atty.

UNITED STATES PATENT OFFICE.

ROBERT W. CHAPMAN, OF NEWARK, NEW JERSEY.

IMPROVEMENT IN TRAVELING-BAG HANDLES.

Specification forming part of Letters Patent No. 208,793, dated October 8, 1878; application filed July 19, 1878.

*To all whom it may concern:*

Be it known that I, ROBERT W. CHAPMAN, of Newark, in the county of Essex and State of New Jersey, have invented a new and useful Improvement in Handles for Bags or Satchels, which improvement is fully described in the following specification.

My improvement consists in a novel construction of handle for bags, satchels, &c., whereby I secure a very ornamental appearance for the same, and greatly increase the strength of the loops by which the handle is attached to the bag or satchel.

My method consists, essentially, in forming the handle of two sections, and making the bottom one of considerable width, to afford a broad bearing-surface for the hand, while the top one is constructed and fitted to serve as an ornament, and, by connections with the loops at its ends, aids in supporting the weight carried as much as does the bottom section.

I secure a highly ornamental appearance and double the security usually obtained by thus connecting the end loops with both sections, which thus act conjointly in supporting the load. I am aware that patents have been issued for sheet-metal handles made in only one piece, with the loops formed by bending the ends; but none bear any resemblance to a wide and ornamented leather handle, which is highly esteemed among purchasers of bags; while they are deficient in strength at the loop or eye, because a very light metal is commonly used to avoid weight in the body of the handle.

My invention is designed to overcome both these defects in the manner shown in the drawings, wherein Figure 1 is a side view of a handle, partly in section. Fig. 2 is a plan of the same. Fig. 3 is a section on line *x x*, Fig. 1; Fig. 4, an end elevation; and Figs. 5 and 6, alternative sections for the middle of the handle.

In Fig. 1 the handle is shown attached to the lock-plate A of a traveling-bag. B is the bottom section of the handle, shaped as shown in section in Fig. 3. C is a central bead formed by the top section of the handle. D are the loops or eyes at the ends of the handle, formed by bending the ends *b* and *c* of the two sections in the manner shown. E are the rings, usually employed to connect the handle freely to the bag or satchel.

The lower section, B, is made flat or slightly rounded on the bottom to fit the hand, and has its edges turned upward and inward into beads *d d* for the same purpose, and to convey an appearance of solidity. The upper section is of arched shape, and forms a central bead, C, fitted into the channel left between the beads *d d*, to cover the opening between them, and projects somewhat above them in imitation of the best leather handles.

The appearance of the complete handle is thus very similar to a solid leather handle formed with two rows of stitches by the sides of a central bead, while it is in reality hollow, light, and cheaply produced when made in the usual manner with appropriate dies.

The end loops may be formed by bending the ends *b* and *c* in the same direction, as shown at the right-hand end of the handle in Fig. 1, or in contrary directions, as shown at the other end. In either the ends *c* are upon the outside of the others and cover the ends *b*, both being secured, if desired, by a rivet, *e*.

Both sections may be covered with thin leather, if desired, to complete the resemblance to a stitched leather handle; but a more ornamental appearance is secured by covering the bottom section in contact with the hand, as well as the beads *d d* and nickel-plating the central bead, C, thus securing a striking contrast of surfaces. The handle may also, for cheaper purposes, be polished, plated, or japanned, and it is in that case that I may employ the modes of construction shown in Figs. 5 and 6. In Fig. 5 the side beads, *d*, are turned directly against the central bead, C, while in Fig. 6 the edges of the side beads are turned up slightly to fit inside the bead C, which embraces the upturned edges, instead of fitting between them, as in Figs. 3 and 5.

In any case the top section furnishes the additional strength to the loop *c* at each end, to improve the connection of the handle with the bag. Even though the inner loop, *b*, is not secured by the rivet passed through the loop *c*, it contributes to the strength of the handle by its own rigidity, and doubles the wearing-surface or thickness inside the loop or eye D.

The form I have devised for my improved handle may not only be made as indicated in Figs. 3, 5, and 6, but by making the two sections each of the full width of the handle and placing the joint between them at some point upon the edge or side of the bead d.

I prefer the modes of construction shown in the drawings, as they more perfectly conceal the joint between the sections and convey the idea of solidity.

Having thus described my invention, I claim as follows:

1. The bag-handle constructed of two metallic sections, shaped and bent as herein described, the bottom being approximately flat and formed with rounded edges to fit the hand, and the top formed with a central bead, C, and side beads, d d, as herein set forth.

2. The bag-handle constructed of upper and lower metallic sections, shaped and bent as herein described, and having their ends b and c formed into double loops, one overlapping the other, to form re-enforce bearings, substantially as and for the purpose set forth.

In testimony that I claim the foregoing as my own I hereto subscribe my name in presence of two witnesses.

ROBERT W. CHAPMAN.

Witnesses:
EDWARD P. ROBERTS,
THOS. S. CRANE.